US011032826B2

(12) United States Patent
Kwasinski et al.

(10) Patent No.: US 11,032,826 B2
(45) Date of Patent: Jun. 8, 2021

(54) RADIO SPECTRUM SHARING LEVERAGING LINK ADAPTATION IN PRIMARY NETWORK

(71) Applicants: Andres Kwasinski, Fairport, NY (US); Fatemeh Shah Mohammadi, Rochester, NY (US)

(72) Inventors: Andres Kwasinski, Fairport, NY (US); Fatemeh Shah Mohammadi, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 16/452,706

(22) Filed: Jun. 26, 2019

(65) Prior Publication Data
US 2019/0394782 A1 Dec. 26, 2019

Related U.S. Application Data

(60) Provisional application No. 62/690,124, filed on Jun. 26, 2018, provisional application No. 62/866,300, filed on Jun. 25, 2019.

(51) Int. Cl.
H04W 72/08 (2009.01)
H04W 16/14 (2009.01)

(52) U.S. Cl.
CPC ......... *H04W 72/082* (2013.01); *H04W 16/14* (2013.01)

(58) Field of Classification Search
CPC .................................................. H04W 72/082
See application file for complete search history.

(56) References Cited

U.S. PATENT DOCUMENTS 7,903,614 B2   3/2011   Pietraski
8,369,793 B2   2/2013   Molnar
(Continued)

OTHER PUBLICATIONS

International Search Report Form PCT/ISA/220, International Application No. PCT/US2019/039142, dated Nov. 20, 2019.
(Continued)

*Primary Examiner* — John D Blanton
(74) *Attorney, Agent, or Firm* — Bond, Schoeneck & King, PLLC; Joseph Noto

(57) ABSTRACT

A wireless communication system and method for allowing two or more wireless networks to operate simultaneously in the same geographical area and through the same radio frequency (RF) spectrum band includes a plurality of wireless networks each network having at least one radio frequency (RF) transmitting node, capable of estimating the effect of its transmission on another, separate, wireless network of the plurality of wireless networks, each transmitting node having a modulation classifier that estimates from a received wireless signal, a modulation scheme used in the transmission of a wireless link that is received in the highest power in a secondary network of the plurality of wireless networks; and a throughput estimator which predicts, without the need to exchange information between a primary and secondary networks of the plurality of wireless networks, the adaptive modulation and coding configuration for the primary link that is received with highest power at the secondary network transmitting node. The transmitting node in the secondary network maintains the change in the primary network relative average throughput within a prescribed target maximum value, while at the same time finding transmit settings for its transmission that will result in as large throughput as allowed by a primary network interference limit.

3 Claims, 2 Drawing Sheets

(56) References Cited

U.S. PATENT DOCUMENTS

| | | |
|---|---|---|
| 8,824,582 B2 | 9/2014 | Jacobsen et al. |
| 8,977,280 B2 | 3/2015 | Qian et al. |
| 9,137,760 B2 | 9/2015 | Hulkkonen et al. |
| 9,781,684 B2 | 10/2017 | Schwent et al. |
| 10,285,201 B2 | 5/2019 | Zhang et al. |
| 2002/0111182 A1* | 8/2002 | Sawyer ............... H04W 16/14 455/522 |
| 2007/0104149 A1 | 5/2007 | Khan et al. |
| 2007/0133387 A1* | 6/2007 | Arslan ............... H04B 1/719 370/206 |
| 2008/0268892 A1* | 10/2008 | Hamdi ............... H04W 52/26 455/522 |
| 2009/0124206 A1* | 5/2009 | Kwon ............... H04W 52/325 455/63.1 |
| 2010/0296404 A1* | 11/2010 | Quadri ............... H04W 72/02 370/252 |
| 2011/0081871 A1 | 4/2011 | Molnar |
| 2012/0269067 A1 | 10/2012 | Burchfiel |
| 2013/0293419 A1 | 11/2013 | Negus et al. |
| 2014/0274104 A1 | 9/2014 | Amanna, III et al. |
| 2016/0119791 A1 | 4/2016 | Koskinen et al. |
| 2016/0269932 A1 | 9/2016 | Nemavat et al. |
| 2017/0170888 A1* | 6/2017 | Yrjola ............... H04W 16/28 |
| 2017/0280463 A1* | 9/2017 | Learned ............ H04W 52/267 |
| 2017/0280472 A1 | 9/2017 | Gupta et al. |
| 2017/0325138 A1* | 11/2017 | da Silva .......... H04W 36/00837 |

OTHER PUBLICATIONS

Zhang "On active learning and supervised transmission of spectrum sharing based cognitive radios by exploiting hidden primary radio feedback," IEEE Transactions on Communications, vol. 58, No. 10, pp. 2960-2970, Oct. 2010.

Li et al. "SHARP: Spectrum Harvesting with ARQ Retransmission and Probing in Cognitive Radio," in IEEE Transactions on Communications, vol. 61, No. 3, pp. 951-960, Mar. 2013.

Bajaj et al. "Cross-Channel Estimation Using Supervised Probing and Sensing in Cognitive Radio Networks," 2011 IEEE International Conference on Communications (ICC), Kyoto, 2011, pp. 1-5.

Zhang et al. "Proactive Cross-Channel Gain Estimation for Spectrum Sharing in Cognitive Radio," in IEEE Journal on Selected Areas in Communications, vol. 34, No. 10, pp. 2776-2790, Oct. 2016.

Li et al. "Improved spectrum sharing algorithm based on feedback control information in cognitive radio networks," in Journal of Systems Engineering and Electronics, vol. 24, No. 4, pp. 564-570, Aug. 2013.

Eswaran et al. "Bits through ARQs: Spectrum Sharing with a Primary Packet System," 2007 IEEE International Symposium on Information Theory, Nice, 2007, pp. 2171-2175.

Zhang et al. "Primary Channel Gain Estimation for Spectrum Sharing in Cognitive Radio Networks," in IEEE Transactions on Communications, vol. 65, No. 10, pp. 4152-4162, Oct. 2017.

Zhang et al. "Proactive channel gain estimation for coexistence between cognitive and primary users," 2012 IEEE Global Communications Conference (GLOBECOM), Anaheim, CA, 2012, pp. 1410-1415.

* cited by examiner

RADIO SPECTRUM SHARING LEVERAGING LINK ADAPTATION IN PRIMARY NETWORK

CROSS REFERENCE

This application claims the benefit of the filing date of U.S. Provisional Patent Application Ser. No. 62/690,124, filed Jun. 26, 2018, which is hereby incorporated by reference in its entirety and of U.S. Provisional Patent Application Ser. No. 62/866,300, filed Jun. 25, 2019, which is hereby incorporated by reference in its entirety.

FIELD

The present disclosure relates to radio spectrum sharing by a plurality of wireless networks, and in particular to a system and method wherein a secondary network utilizes a modulation classifier and throughput estimator to estimate its effect on a primary network for a given transmission power setting.

BACKGROUND

Improving the efficiency in using the radio frequency (RF) spectrum requires the ability of wireless networks to operate by sharing with other networks the simultaneous use of a spectrum band. However, to achieve this function, transmitting nodes in a network need to know the effect of their transmission on the other networks in terms of generated interference and resulting signal-to-interference-plus-noise ratio (SINR). One approach for nodes to acquire this knowledge is by granting access to the control channels on the other network that carry information associated with the experienced link quality (e.g., packet reception indicator, transmit power adaptation feedback, link outage indicator, packet retransmission request, etc.) However, this approach suffers from the shortcoming that in most cases the two networks are completely separate and access to control channels of one network is not allowed to the nodes in the other network. Another approach takes advantage that networks adapt the modulation scheme that is used during transmission based on the experienced link SINR. With this approach, as part of the transmission process, nodes may infer the effect of their transmissions on other networks by monitoring changes in the modulation scheme used on the other network's link (achieved through processing the signal received from the other network). However, wireless communications systems can switch between a small number of modulation schemes, leading to the information that can be inferred with this approach being with a very coarse resolution that limits their application in spectrum sharing.

SUMMARY

In accordance with one aspect of the present invention, there is provided wireless communication system, including:

a plurality of wireless networks simultaneously operating over the same RF spectrum band, each network including at least one radio frequency (RF) transmitting node capable of estimating the effect of its transmission on another, separate, wireless network of the plurality of wireless networks, wherein each at least one transmitting node comprises:

a modulation classifier that estimates from a received wireless signal, a modulation scheme used in the transmission of a wireless link that is received in the highest power in a secondary network of the plurality of wireless networks; and a throughput estimator which predicts, without the need to exchange information between a primary and secondary networks of the plurality of wireless networks, the adaptive modulation and coding configuration for the primary link that is received with highest power at the secondary network transmitting node, wherein the transmitting node in the secondary network maintains the change in the primary network relative average throughput within a prescribed target maximum value, while at the same time finding transmit settings for its transmission that will result in as large throughput as allowed by a primary network interference limit.

In accordance with another aspect of the present disclosure, there is provided a method for allowing two or more wireless networks to operate simultaneously in the same geographical area and through the same radio frequency (RF) spectrum band, including:

a) without transmitting, a transmitting node at a secondary network listening to transmissions from a primary network and estimating the modulation scheme used in the link from the primary network received with highest power;

b) the transmitting node at the secondary network sending a sequence of probe (short) packets, each at a different transmit power and, after transmitting each of the sequence of probe packets, listening to transmissions from the primary network and estimating the modulation scheme used in the link from the primary network that is received with highest power, wherein for any intended transmit power of choice, a throughput estimator at the transmitting node in the secondary network estimates the throughput that would be achieved at the link from the primary network received with highest power based on, a modulation scheme estimated in step a) and transmits power for each probe packet and the corresponding estimated modulation scheme from step b).

These and other aspects of the present disclosure will become apparent upon a review of the following detailed description and the claims appended thereto.

DETAILED DESCRIPTION

Figure 1:
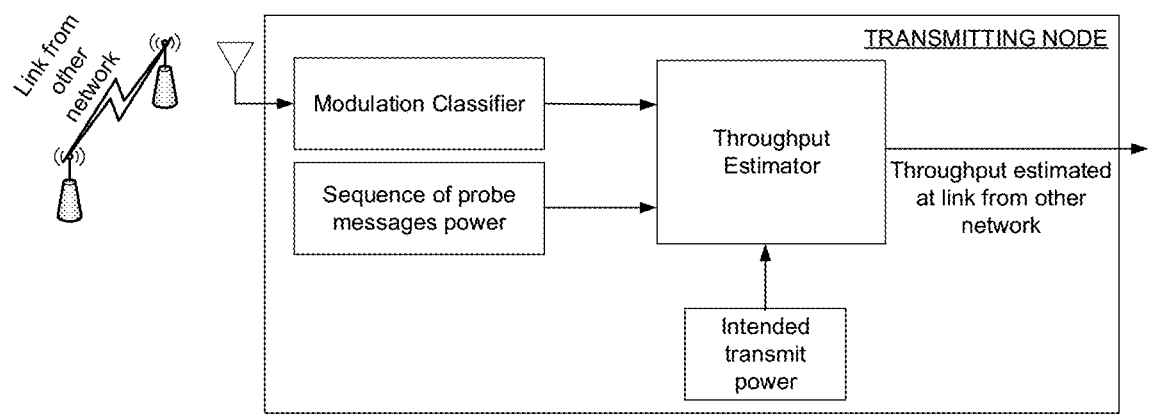
FIG. 1 shows an embodiment of the main elements and a block diagram with the main components in the wireless node implementing the system.

The disclosure pertains to a system of two or more wireless networks that operate simultaneously in the same geographical area and through the same radio frequency (RF) spectrum band. The radio transmitters implementing the disclosure include a "modulation classifier" and a "throughput estimator". Details of suitable individual components follow next.

Primary network (PN): is one of the wireless networks sharing the use of an RF spectrum band with at least one other wireless network. As is customary in today's technology, wireless communication in this network makes use of "Link Adaptation", also known as "Adaptive Modulation and Coding" (AMC), which is a technique whereby a radio transmitter adapts the modulation scheme and forward error control (FEC) channel coding rate based on a measurement of link quality (often the SINR) received through a feedback channel from the receiver. A setting of modulation scheme and FEC channel coding rate constitutes an AMC mode and establishes the transmit throughput that is achieved at the PN link. Essentially all link adaptation implementations make use of a few (less than six) modulation schemes and, for each modulation scheme it is possible to choose among multiple channel coding rates. In this way, each modulation scheme is associated with a broad range of achievable throughput values that are then fine-tuned to a more precise throughput value by the choice of a channel coding rate for the given modulation scheme. As such, the modulation scheme serves as a coarse control nob in the link adaptation and the choice of channel coding rate provides the fine-tuning control nob. The present disclosure enables the discovery of the more precise throughput for a given system.

Secondary network (SN): is the wireless network where links are established using the present disclosure in such a way that the transmit power induces an RF interference on the PN that is deemed acceptable by virtue of degrading the communication performance in the PN by not more than a pre-established limit (measured in relative change in data throughput). To operate in such a way, the present disclosure enables the SN transmitting nodes to estimate their effect on the PN for a given transmit power setting. It is assumed that the PN and the SN are separate networks to the extent that they cannot access each other's channels (control channels or otherwise). The operation of the system does not require the PN from even realizing the existence of an SN. More than one SN, each also separate from the others, can coexist in the same system.

SN transmitting node: is a radio transmitter operating in the SN that implements the present disclosure as part of the transmission process. An SN transmitting node uses the present disclosure to estimate its effect on the PN for a given transmit power setting.

Modulation Classifier: is a signal processing algorithm that estimates from the received wireless signal, the modulation scheme that is being used in the transmission of a wireless link that is received with the highest power. The received wireless signal is composed by the superposition of all wireless transmissions that are received with power surpassing the noise floor. The modulation classifier will process the received signal using any method existing in the current art, or any other for this purpose that can be developed in the future, and will estimate the modulation used in the component signal that is received with highest power, treating the other component signals as background noise. Suitable modulation classification algorithms are known to persons skilled in the art. A suitable modulation classification algorithm, for example, is disclosed in H. Abuella and M. K. Ozdemir, "Automatic modulation classification based on kernel density estimation," Canadian Journal of Electrical and Computer Engineering, vol. 39, no. 3, pp. 203-209, Summer 2016.

Figure 2:
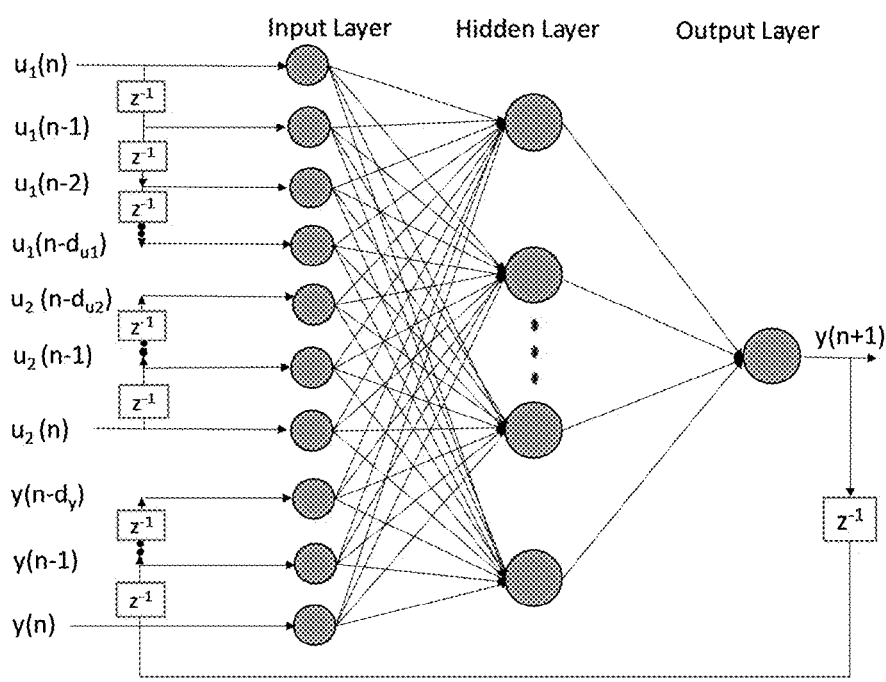
FIG. 2 shows an embodiment of the throughput estimator in the form of a non-linear autoregressive exogenous neural network (NARX-NN).

Throughput estimator: is a signal processing algorithm capable of estimating for a given transmit power at an SN transmitting node, the throughput (equivalently the full AMC mode) that would be achieved at the PN link that the same SN transmitting node is receiving with largest power. As such, the throughput estimator is capable to estimate both the modulation scheme and channel coding rate settings at the PN link. The inputs to the throughput estimator are a sequence of probe packets transmit power, the modulation scheme at the PN link corresponding to each probe packet (the output from the modulation classifier) and an SN transmitting node transmit power setting. The output of the throughput estimator is the throughput that would be achieved at the PN link that the SN transmitting node is receiving with largest power if the SN transmitting node were to transmit with the power setting that is inputted to the throughput estimator. Because of their unambiguous relation, an estimate of throughput at a link is also an estimate of the full AMC mode settings used for transmission at that link. Suitable signal processing algorithms are known to persons skilled in the art. In one embodiment, the throughput estimator can be implemented using a non-linear autoregressive exogenous neural network (NARX-NN), as shown in FIG. 2. In embodiments as this one, which is based on a neural network, the internal parameters of the throughput estimator are derived from an offline learning process that presents the neural network with multiple examples generated from a simulator of the complete system of PN and SNs.

For operation of the disclosed technology an SN transmitting node follows the steps described next:

Without transmitting, the SN transmitting node listens to transmissions from the PN and uses its modulation classifier to estimate the modulation scheme used in the link from the PN received with highest power.

The SN transmitting node proceeds to send a sequence of probe (short) packets, each at a different transmit power level.

After the transmission of each probe packet, the SN transmitting node listens to transmissions from the PN and uses its modulation classifier to estimate the modulation scheme used in the link from the PN received with highest power.

Using as inputs the sequence of probe packets transmit powers (including with power equal to zero the case where the SN transmitting node the listens without transmitting to the transmissions in the PN) and the modulation scheme estimated by the modulation classifier for each probe packet, the throughput estimator provides an estimate of the throughput (equivalently the full AMC mode) that would be achieved at the PN link that is received with highest power by the SN transmitting node for a given transmit power of the same SN transmitting node.

The throughput estimator is implicitly characterizing the relation between link throughput and SINR, which is characteristic of the wireless communication standard specification in use at the PN. Also, because of their unambiguous correspondence, the operation of estimation of throughput is equivalent to estimating the corresponding full AMC mode. Since the full AMC mode is described by a choice of modulation scheme and a choice of channel coding rate, the operation performed by the throughput estimator is also one of estimating the modulation scheme and channel coding rate. Consequently, the present disclosure goes beyond the coarse estimation of a range of channel SINRs that could be derived from sensing the modulation scheme in use at a PN link and, instead, estimates the fine-grained information of the actual AMC mode (or a throughput value), including channel coding rate. This allows an SN transmitting node to estimate with fine granularity the effect that its transmission at some power level will have on the PN. This feature, in turn, allows the SN transmitting node to communicate without exchanging any information with the PN, by simultaneously transmitting over the same RF spectrum band as the PN through controlling its transmit power with fine precision so as not to degrade the PN link quality more than a preset limit.

The present disclosure can be applied for all scenarios where a transmitting node in a network needs to estimate the change in performance (e.g., throughput) at the wireless link from another network that is received with the largest power and where the two networks cannot exchange information. One example of this application is in "Dynamic Spectrum Access" (DSA). The radio spectrum is a natural resource of important economic value to today's society, since it provides the medium needed to deploy and operate wireless communications networks. To achieve efficient use of this resource, the concept of DSA has been developed as a technology for multiple wireless networks to share the use of the same portion of the radio spectrum within the same geographical location. In DSA, there is one network that is incumbent to the radio spectrum band of interest, called the "Primary Network" (PN), and one or more "Secondary Networks" (SNs) that opportunistically make use of the same spectrum band. With the particular form of "underlay" DSA, nodes from the SNs can transmit at the same time as those in the PN but the nodes in the SNs are restricted in their transmission so that their effect on the PN remains within strict constraints usually set by the PN itself. In order to meet these constrains, the SN needs a method to assess the effects that its transmissions would have on the PN. However, because of the PN and SNs are separate networks, it is to expect that there is not going to be any explicit exchange of information between them about their performance. This, then, constitutes a use case where the nodes in the SNs would need to make use of this present disclosure before setting their transmit power.

In an embodiment, a method for radio spectrum sharing includes: step 1, without transmitting, the transmitting node at the secondary network listens to transmissions from the primary network and estimates the modulation scheme used in the link from the primary network received with highest power. Step 2, the transmitting node at the secondary network sends a sequence of probe (short) packets, each at a different transmit power and, after transmitting each probe packets, listens to transmissions from the primary network and estimate the modulation scheme used in the link from the primary network that is received with highest power. For any intended transmit power of choice, the throughput estimator at the transmitting node in the secondary network estimates the throughput that would be achieved at the link from the primary network received with highest power based on, the modulation scheme estimated in step I and transmit power for each probe packet and the corresponding estimated modulation scheme from step II.

Operation of the disclosed system can be explained according to the following embodiment. In the present scenario two wireless networks, a PN and an SN, simultaneously operate in the same geographical area using the same RF spectrum band. The SN is allowed to transmit simultaneously to the PN using the same RF spectrum band as long as the interference it creates on the PN does not degrade the PN throughput more than a pre-established limit in terms of relative throughput change at the PN. As customary in today's technology, the PN transmissions make use of link adaptation, which in this case is assumed for exemplifying purposes to be the same as the one used in the LTE cellular communication standard. For this case, there are fifteen possible AMC modes divided into QPSK modulation (with six possible channel coding rates), 16-QAM (with three possible channel coding rates), and 64-QAM (with six possible channel coding rates). The Throughput Estimator in the present system is implemented using a NARX neural network with internal parameters that are obtained through an iterative training process whereby a large number of examples of inputs to the Throughput Estimator and the corresponding output are generated through an offline simulation of the system described here. Once the training process is completed, and the NARX neural network have been found, the present system is deployed within the SN transmitting nodes. During operation, the described process is followed by an SN transmitting node intended on sending data to an SN receiving node. By making use of this disclosure, the SN transmitting node is able to estimate the throughput (equivalently, the full AMC mode) that the PN link that it is being received with highest power would set for a choice of transmitting power at the SN transmitting node. Knowing the estimated throughput at the PN link for different transmit power settings allows the SN transmitting node to choose the largest transmit power that would change the relative throughput at the PN link by an amount less than the pre-established limit.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A wireless communication system, comprising:
a plurality of wireless networks simultaneously operating over a same RF spectrum band, at least one network of the plurality of wireless networks comprising a secondary network having at least one radio frequency (RF) transmitting node, wherein each of the at least one radio frequency (RF) transmitting nodes is capable of estimating a change in the average throughput of a transmission of the at least one radio frequency (RF) transmitting node on at least one primary network of the plurality of wireless networks, wherein each at least one radio frequency (RF) transmitting node comprises:
a modulation classifier that estimates from a sensed wireless signal, a modulation scheme used in a transmission of a wireless signal that carries information over a wireless link that has been established in the at least one primary network of the plurality of wireless networks; and
a throughput estimator which determines, without exchanging information between networks of the plurality of wireless networks, a forward error control (FEC) channel coding rate for the sensed wireless signal, wherein the at least one radio frequency (RF) transmitting node in the secondary network uses information from the throughput estimator to determine a transmitting power level of the transmission of the at least one radio frequency (RF) transmitting node that does not reduce the throughput over the wireless link associated with the sensed wireless signal sent and received in the primary network by more than a pre-scribed target maximum value.

2. The system of claim 1, wherein the throughput estimator applies a non-linear autoregressive exogenous neural network (NARX-NN).

3. A method for allowing two or more wireless networks to operate simultaneously in the same geographical area and through the same radio frequency (RF) spectrum band, comprising:
listening with a transmitting node of a secondary wireless network to a transmission of a wireless signal that carries information over a wireless link that has been established within a primary wireless network, while the secondary wireless network transmitting node is not transmitting;

estimating a modulation scheme and a forward error control (FEC) channel coding rate of the wireless signal transmitted within the primary wireless network without exchanging information between networks of the two or more wireless networks;

sending by the transmitting node of the secondary wireless network a sequence of probe packets each at a different transmit power level;

listening with the transmitting node of the secondary wireless network to a radio signal associated to the link transmitted within the primary wireless network corresponding to each probe packet transmit power level of the sequence;

estimating a modulation scheme and throughput over the link from the primary wireless network for the transmission corresponding to each probe packet transmit power level of the sequence; and determining the transmit power level of the transmission from the secondary wireless network that does not reduce the throughput achieved over the link from the primary wireless network by more than a prescribed maximum value.

* * * * *